US010503218B2

(12) United States Patent
Suzuki et al.

(10) Patent No.: US 10,503,218 B2
(45) Date of Patent: Dec. 10, 2019

(54) INFORMATION PROCESSING DEVICE AND INFORMATION PROCESSING METHOD TO CONTROL DISPLAY OF IMAGE BASED ON INCLINATION INFORMATION

(71) Applicant: SONY CORPORATION, Tokyo (JP)

(72) Inventors: Seiji Suzuki, Kanagawa (JP); Yasushi Okumura, Tokyo (JP); Yusuke Miyazawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/621,533

(22) Filed: Jun. 13, 2017

(65) Prior Publication Data

US 2017/0277229 A1 Sep. 28, 2017

Related U.S. Application Data

(63) Continuation of application No. 13/295,732, filed on Nov. 14, 2011, now Pat. No. 9,678,543.

(30) Foreign Application Priority Data

Nov. 26, 2010 (JP) .................................. 2010-263408

(51) Int. Cl.
*G06F 1/16* (2006.01)
*G06F 3/0481* (2013.01)
(Continued)

(52) U.S. Cl.
CPC .......... *G06F 1/1694* (2013.01); *G06F 3/0482* (2013.01); *G06F 3/0485* (2013.01);
(Continued)

(58) Field of Classification Search
CPC ........... G06F 1/1692; G06F 2200/1637; G06F 3/0346; G06F 3/0488
See application file for complete search history.

(56) References Cited

U.S. PATENT DOCUMENTS 7,860,644 B2 * 12/2010 Orr ........................ G01C 21/36
340/990
2007/0107068 A1 5/2007 Kelley et al.
(Continued)

FOREIGN PATENT DOCUMENTS

CN 102265242 A 11/2011
EP 1667471 A1 6/2006
(Continued)

*Primary Examiner* — Michelle L Sams
(74) *Attorney, Agent, or Firm* — Chip Law Group

(57) ABSTRACT

An information processing apparatus, method and computer program product cooperate to provide a device that changes the way content is displayed depending on an inclination angle of the device. The device includes an inclination acquisition device that acquires inclination information of a display housing that houses a display with a displayed image thereon. A first controller causes a first change to the displayed image according to the inclination information. A second controller causes a second change to the displayed image when a predetermined condition is met with respect to the inclination information. By including subcomponents that cooperate in this manner, the device allows a user to perceive a displayed image at various viewing angles and easily recognize whether certain displayed features are able to be actuated when the device is positioned in a certain inclination angle.

4 Claims, 11 Drawing Sheets

(51) Int. Cl.
   *G06F 3/0482* (2013.01)
   *G06F 3/0485* (2013.01)
   *G06F 3/0488* (2013.01)
   *G06T 19/00* (2011.01)
(52) U.S. Cl.
   CPC ........ *G06F 3/0488* (2013.01); *G06F 3/04815* (2013.01); *G06F 2200/1637* (2013.01); *G06T 19/006* (2013.01)

(56) References Cited

U.S. PATENT DOCUMENTS

| | | | |
|---|---|---|---|
| 2009/0197635 A1* | 8/2009 | Kim | G06F 3/0346 455/550.1 |
| 2009/0201246 A1* | 8/2009 | Lee | G06F 1/1626 345/156 |
| 2009/0225044 A1 | 9/2009 | Jeon et al. | |
| 2010/0064259 A1 | 3/2010 | Alexanderovitc et al. | |
| 2010/0066763 A1* | 3/2010 | MacDougall | G06F 1/1626 345/656 |
| 2010/0138766 A1* | 6/2010 | Nakajima | G06F 1/1626 715/767 |
| 2010/0139991 A1* | 6/2010 | Philipp | G06F 3/0418 178/18.06 |
| 2010/0214216 A1 | 8/2010 | Nasiri et al. | |
| 2010/0259610 A1 | 10/2010 | Petersen | |
| 2010/0295958 A1 | 11/2010 | Larsson et al. | |
| 2010/0299599 A1* | 11/2010 | Shin | G06F 3/0482 715/702 |
| 2011/0083089 A1 | 4/2011 | Pahud et al. | |
| 2011/0161884 A1* | 6/2011 | Dugan | G06F 1/1626 715/843 |
| 2011/0314422 A1 | 12/2011 | Cameron et al. | |
| 2012/0036433 A1 | 2/2012 | Zimmer et al. | |
| 2012/0086629 A1* | 4/2012 | Thorn | G06F 3/0482 345/156 |
| 2012/0131458 A1* | 5/2012 | Hayes | H04W 4/21 715/716 |
| 2012/0131495 A1 | 5/2012 | Goossens et al. | |
| 2013/0007653 A1* | 1/2013 | Stolyarov | G06F 1/1626 715/784 |

FOREIGN PATENT DOCUMENTS

| | | |
|---|---|---|
| JP | 2004-334642 A | 11/2004 |
| JP | 2005-245619 A | 9/2005 |
| JP | 2008-176641 A | 7/2008 |
| JP | 2009-009252 A | 1/2009 |
| JP | 2009-251687 A | 10/2009 |
| JP | 2010-086192 A | 4/2010 |
| JP | 2010-109552 A | 5/2010 |

* cited by examiner

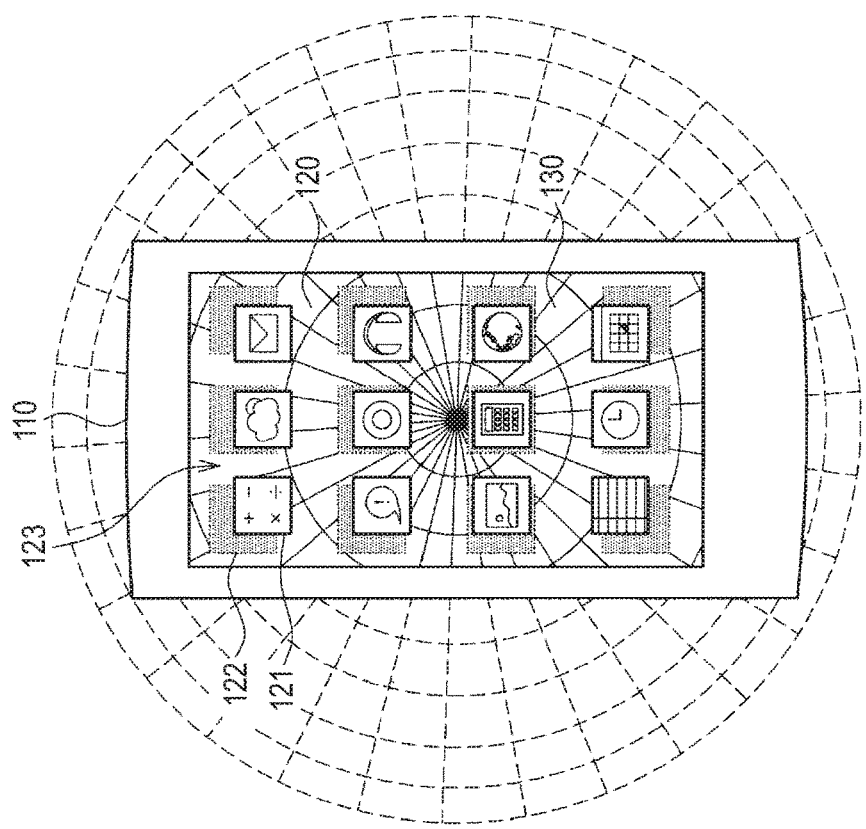
FIG.7
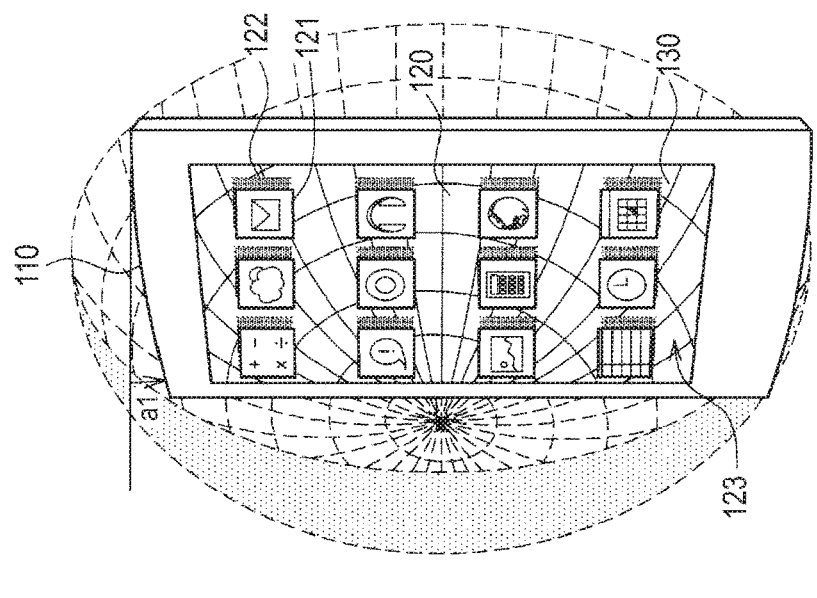

INFORMATION PROCESSING DEVICE AND INFORMATION PROCESSING METHOD TO CONTROL DISPLAY OF IMAGE BASED ON INCLINATION INFORMATION

CROSS-REFERENCE TO RELATED APPLICATIONS

The present application is a continuation application of U.S. patent application Ser. No. 13/295,732, filed Nov. 14, 2011, which claims the benefit of priority from prior Japanese Priority Patent Application JP 2010-263408 filed in the Japan Patent Office on Nov. 26, 2010. Each of the above-referenced applications is hereby incorporated herein by reference in its entirety.

FIELD

The present disclosure relates to an information processing device, an information processing method, and a computer program product, and particularly to an information processing device, an information processing method, and a computer program product that brings a display change to a displayed image.

BACKGROUND

In recent years, the arithmetic capability and the communication speed of information processing devices have been rapidly enhanced. However, in a relatively small-sized information processing device such as a portable terminal, for example, since the size of a display unit which displays processing results is limited, there are cases where the quantity of information to be displayed is restricted and high performance as described above is not fully utilized.

Thus, a technique for making effective use of a display unit of an information processing device has been developed. For example, there is a technique in which a touch panel is provided in the display unit to secure operability and expand the display unit. JP-A-2010-109552 and JP-A-2009-009252 disclose a technique in which pushing conditions of a touch panel are used as operation inputs.

In addition, there is a technique in which changes in the state of a housing of an information processing device are used as operation inputs, and various operation inputs are realized without reducing the size of a display unit. JP-A-2004-334642 discloses a technique in which application of shaking to a housing is used as an operation input. JP-A-2005-245619 discloses a technique in which inclination of a housing is used as an operation input.

SUMMARY

However, as recognized by the present inventors there is a problem in that unintended operation inputs by a user occur when there are various operation input methods as described in JP-A-2010-109552, JP-A-2009-009252, JP-A-2004-334642, and JP-A-2005-245619. For example, in an information processing device in which inclination causes a certain operation, there is a case where inclination is acquired as an operation input even with the user's unintended slight inclination of the housing. For this problem, not acquiring slight inclination of a housing as an operation input was considered. In such a case, however, for example, if nothing happens even though the housing of an information processing device is inclined, it is problematic in that information regarding whether inclination of a housing is not set as an operation input or just the response of a sensor detecting inclination is poor is not delivered to the user.

Thus, it is desirable to provide an information processing device, an information processing method, and a program which are novel and improved and can perform suppression control for operation inputs and provide a user with information on the suppression control.

According to an exemplary information processing apparatus embodiment, the apparatus includes
an inclination acquisition device that acquires inclination information of a display housing that houses a display with a displayed image thereon;
a first controller that causes a first change to the displayed image according to the inclination information; and
a second controller that causes a second change to the displayed image when a predetermined condition is met with respect to the inclination information.

One aspect of this embodiment is that it may further include
a processing circuit that includes at least one of the inclination acquisition device, the first controller and the second controller.

According to another aspect the processing circuit responds to a detected shaking of the display housing by performing a zero point adjustment.

According to another aspect the predetermined condition is met when the inclination information exceeds a predetermined threshold.

According to another aspect the embodiment may further include the display, the display being a touchpanel, wherein the predetermined condition is met when an operation on the touchpanel is not detected.

According to another aspect the first change to the displayed image is a movement of at least one of a shadow of a displayed object, a background portion of the displayed object, and reflected light.

According to another aspect when an amount of inclination of the display housing is greater than zero but less than a predetermined amount, the displayed object does not move on the display despite the movement of the at least one of the shadow of the displayed object, the background portion of the displayed object, and the reflected light.

According to another aspect when an amount of inclination of the display housing is greater than a predetermined amount, the displayed object moves on the display along with the movement of the at least one of a shadow of the displayed object, the background portion of the displayed object, and the reflected light.

According to another aspect when the amount of inclination of the display housing is greater than the predetermined amount, other objects that were previously hidden are displayed on the display.

According to another aspect the second change to the displayed image is a movement of a displayed object, the displayed object being user-selectable to trigger a processing operation.

According to an exemplary information processing method embodiment, the method includes
acquiring from an inclination acquisition device inclination information of a display housing that houses a display with a displayed image thereon;
making a first change to the displayed image according to the inclination information; and
making a second change to the displayed image when a predetermined condition is met with respect to the inclination information.

According to one aspect of this embodiment, the making a first change and the making a second change are made with a processing circuit.

According to another aspect the embodiment includes responding to a detected shaking of the display housing by performing a zero point adjustment.

According to another aspect the predetermined condition is met when the inclination information exceeds a predetermined threshold.

According to another aspect the making the first change to the displayed image includes moving on the display at least one of a shadow of a displayed object, a background portion of the displayed object, and reflected light.

According to another aspect when an amount of inclination of the display housing is greater than zero but less than a predetermined amount, not moving the displayed object on the display while moving the at least one of the shadow of the displayed object, the background portion of the displayed object, and the reflected light.

According to another aspect when an amount of inclination of the display housing is greater than a predetermined amount, moving the displayed object on the display along while also moving the at least one of the shadow of the displayed object, the background portion of the displayed object, and the reflected light.

According to another aspect when the amount of inclination of the display housing is greater than the predetermined amount, displaying other objects that were previously hidden on the display.

According to another aspect the second change to the displayed image is a movement of a displayed object, the displayed object being user-selectable to trigger a processing operation.

According to an exemplary non-transitory computer readable storage device embodiment, the device includes instructions stored thereon that when executed by a processing circuit perform an information processing method that includes
acquiring from an inclination acquisition device inclination information of a display housing that houses a display with a displayed image thereon;
making a first change to the displayed image according to the inclination information; and
making a second change to the displayed image when a predetermined condition is met with respect to the inclination information.

According to the embodiments of the present disclosure described above, it is possible to provide an information processing device, an information processing method, and a program which can perform suppression control for operation inputs and provide a user with information on the suppression control.

BRIEF DESCRIPTION OF THE DRAWINGS

FIG. 7 is a diagram showing an example of a display change in a portable terminal according to a second embodiment of the present disclosure;

DETAILED DESCRIPTION

Figure 1:
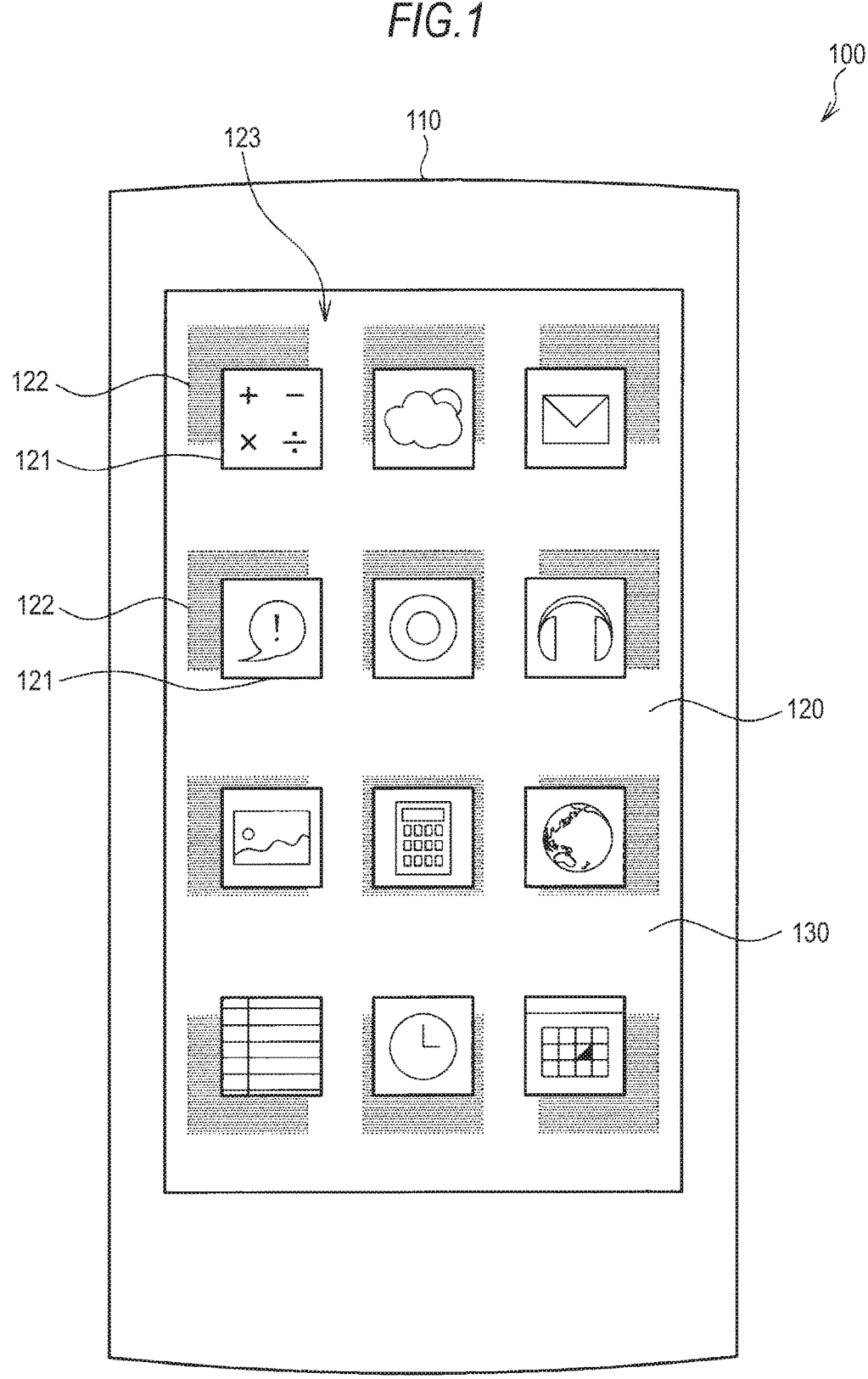
FIG. 1 is a diagram showing the appearance of a portable terminal according to a first embodiment of the present disclosure.

Hereinafter, exemplary embodiments of the present disclosure will be described in detail with reference to accompanying drawings. Repetitive description will be omitted by giving the same reference numerals to constituent elements that have substantially the same functional configuration in the present specification and the drawings.
Furthermore, description will be provided in the following order.
1. First Embodiment
2. Second Embodiment
3. Third Embodiment
4. Fourth Embodiment
5. Fifth Embodiment
6. Supplement 1. First Embodiment First, a first embodiment of the present disclosure will be described.
(Configuration of Portable Terminal)

FIG. 1 is a diagram showing the appearance of a portable terminal 100 according to a first embodiment of the present disclosure. The portable terminal 100 is an example of an information processing device. Referring to FIG. 1, the portable terminal 100 includes a housing 110, and the housing 110 is provided with an LCD (Liquid Crystal Display) 120. The LCD 120 is an example of a display unit and displays images as the output of the portable terminal 100. Furthermore, the display unit is not limited to the LCD 120, and an arbitrary display device such as an organic EL (Electro-Luminescence) panel may be used. The LCD 120 may be provided with a touch panel 130. The touch panel 130 senses a user's contact with the LCD 120. When an operation unit such as a button is separately provided, the touch panel 130 may not necessarily be provided. The portable terminal 100 can have various functions of, for example, voice calling, network communication, music and video reproduction, capturing moving and still images, and the like. The housing 110 may be provided with other devices to realize these functions, for example, a speaker, a microphone, a camera, input and output terminals, an antenna, or the like, in addition to the LCD 120 and the touch panel 130.

Subsequently, an example of an image displayed on the LCD 120 will be described with reference to FIG. 1. The LCD 120 displays an icon 121 accompanied by an icon shadow 122. On the back side of the icon 121 and the icon shadow 122, a background 123 is displayed. The icon 121 is an example of an object included in the displayed image. The icon 121 can be an operational component which is operated by a user through, for example, the touch panel 130. In this case, the user can give an operation instruction for realizing a predetermined function in the portable terminal 100 by contacting the area where the icon 121 of the LCD 120 is displayed through the touch panel 130. In addition, the icon 121 may be an image indicating content that can be used by the portable terminal 100. Furthermore, the object is not limited to the icon 121, and may be, for example, an image of video content. The icon shadow 122 is displayed as a visual effect to emphasize the stereoscopic effect when, for example, the icon 121 is to be three-dimensionally displayed. The background 123 is displayed as the background of the icon 121 and the icon shadow 122. For example, when the icon 121 is an operational component that is operated by a user through the touch panel 130, an operation instruction is not given to the portable terminal 100 even if the user contacts the area where the background 123 of the LCD 120 is displayed through the touch panel 130.

Figure 2:
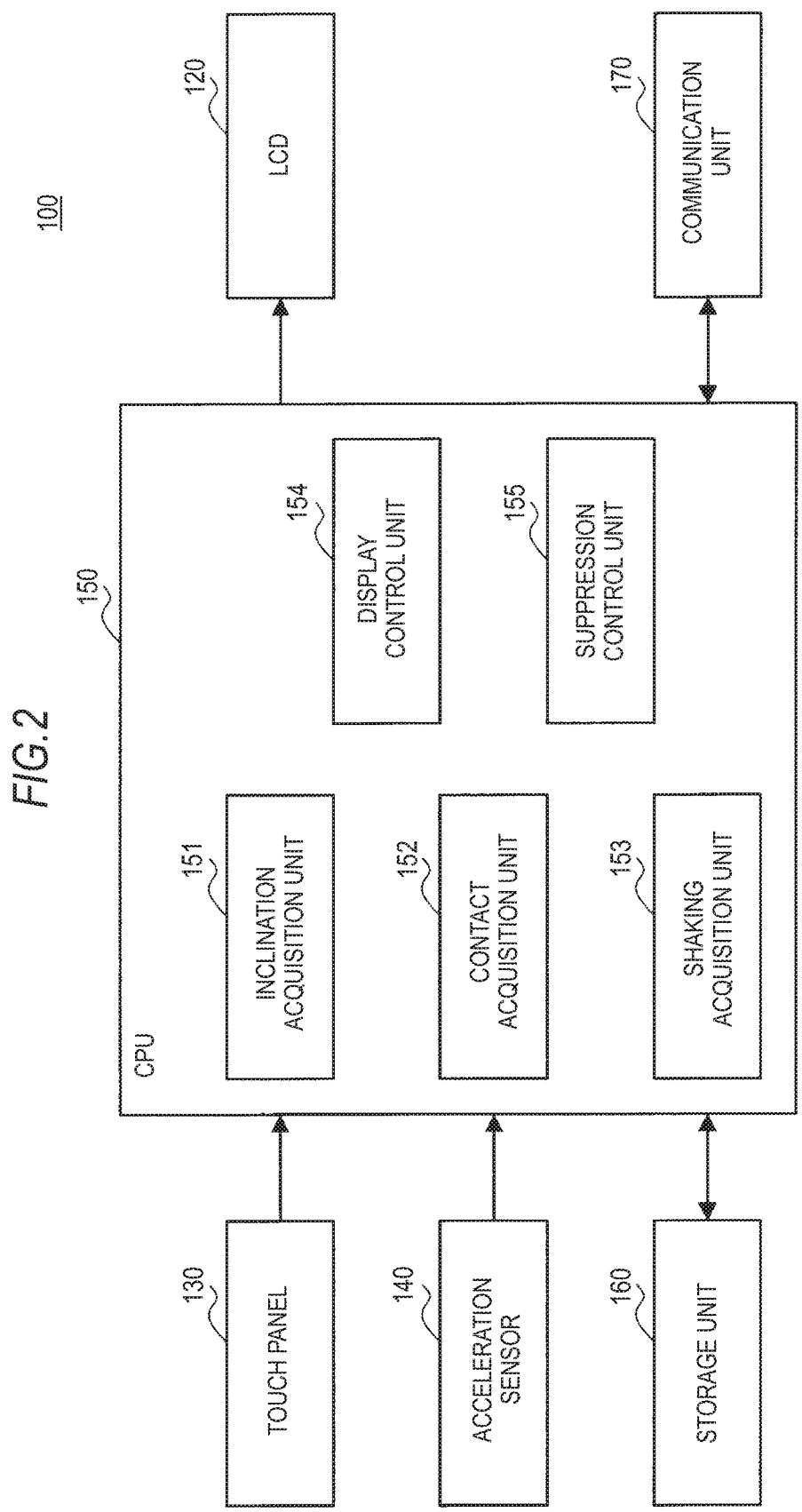
FIG. 2 is a block diagram showing a functional configuration of the portable terminal according to the first embodiment of the present disclosure.

FIG. 2 is a block diagram showing a functional configuration of the portable terminal 100 according to the first embodiment of the present disclosure. Referring to FIG. 2, the portable terminal 100 includes the LCD 120, the touch panel 130, an acceleration sensor 140, a CPU (Central Processing Unit) 150, a storage unit 160, and a communication unit 170. In addition, the CPU 150 realizes functions of an inclination acquisition unit 151, a contact acquisition unit 152, a shaking acquisition unit 153, a display control unit 154, and a suppression control unit 155.

Since each of the functions of the LCD 120 and the touch panel 130 has been described before referring to FIG. 1, detailed description thereof will be omitted, but herein, description will be provided in relation to other function configurations. A display image is provided to the LCD 120 by the CPU 150. The touch panel 130 provides the CPU 150 with the presence of user contact with the LCD 120, and information of a position where the user contact on the LCD 120.

The acceleration sensor 140 is a sensor that senses the acceleration applied to the housing 110 of the portable terminal 100. The information of acceleration that the acceleration sensor 140 senses is provided to the CPU 150. With a change in acceleration, it is possible to detect a change in the state of the housing 110, for example, inclination, shaking, and the like of the housing 110. Furthermore, the acceleration sensor 140 can be an acceleration sensor of any type, for example, a two-axis acceleration sensor, a three-axis acceleration sensor, or the like, according to the change type of the state of the housing 110 necessary for a process in the CPU 150. In addition, other sensors that can detect a change in the state of the housing 110 as described above may be used instead of the acceleration sensor 140.

The CPU 150 controls the operation of each part of the portable terminal 100. The CPU 150 is a processor that executes programs stored in the storage unit 160, and realizes functions of the inclination acquisition unit 151, the contact acquisition unit 152, the shaking acquisition unit 153, the display control unit 154, and the suppression control unit 155 by executing the programs. In addition to these functions, the CPU 150 realizes various functions that the portable terminal 100 can have, for example, voice calling, network communication, music and video reproduction, capturing moving and still images, and the like. In order to realize these functions, the CPU 150 acquires information from the touch panel 130 and the acceleration sensor 140, provides images to the LCD 120, and exchanges data with the storage unit 160 and the communication unit 170. In addition, the CPU 150 may acquire or provide information from or with other devices that the portable terminal 100 has, in order to realize the functions.

Hereinbelow, functions of the inclination acquisition unit 151, the contact acquisition unit 152, the shaking acquisition unit 153, the display control unit 154, and the suppression control unit 155 realized by the CPU 150 will be described. The functions can be realized by the CPU 150 executing the programs stored in the storage 160 as described above, but it is not limited thereto, and all or some of the functions may be realized by a dedicated circuit configuration provided separately from, for example, the CPU 150.

The inclination acquisition unit 151 acquires inclination of the housing 110 based on information of acceleration of the housing 110 of the portable terminal 100 provided from the acceleration sensor 140. Specifically, the inclination acquisition unit 151 may calculate the direction and angle of the inclination of the housing 110 based on the direction and magnitude of the acceleration of the housing 110. The inclination acquisition unit 151 may provide the calculated direction and angle of the inclination of the housing 110 to the display control unit 154 and the suppression control unit 155.

The contact acquisition unit 152 acquires information of the presence of user contact with the LCD 120 and the position where the user contacts the LCD 120, which is provided from the touch panel 130. For example, the contact acquisition unit 152 may acquire the contact with an area where the icon 121 on the LCD 120 is displayed as a pressing operation to the icon 121. In addition, the contact acquisition unit 152 may acquire the contact as a long-pressing operation to the icon 121 when the contact with the area where the icon 121 on the LCD 120 is displayed is continued over a predetermined time period. Furthermore, the contact acquisition unit 152 may acquire the contact as an operation of a movement (also referred to as a flicking operation) when the contact position is moved in the state where the contact is continued on the LCD 121. The contact acquisition unit acquires a pressing operation, a long-pressing operation, or a movement operation for the icon 121, and may provide the operation to the display control unit 154 and the suppression control unit 155.

The shaking acquisition unit 153 acquires the shaking of the housing 110 based on the information of the acceleration of the housing 110 of the portable terminal 100 provided from the acceleration sensor 140. Specifically, the shaking acquisition unit 153 may acquire that there was the shaking of the housing 110 based on a change in the acceleration of the housing 110 within a predetermined time. The shaking acquisition unit 153 acquires that there was the shaking of the housing 110, and may provide the information to the display control unit 154 and the suppression control unit 155. Optionally, when the shaking acquisition unit 153 detects shaking of the housing, a zero point adjustment is made to the inclination angle of the housing (e.g., reset or recalibrate the angle at which the housing is deemed to not be inclined).

The display control unit 154 provides the image to the LCD 120. In addition, the display control unit 154 makes a display change in the icon 121, the icon shadow 122, or the background 123 included in the display image. Herein, the display control unit 154 may make the display change in a part or all of the inclination of the housing 110 acquired by the inclination acquisition unit 151, various contact operations acquired by the contact acquisition unit 152, and the shaking of the housing 110 acquired by the shaking acquisition unit 153. The display change includes at least a first display change and a second display change according to the inclination of the housing 100 acquired by the inclination acquisition unit 151. Furthermore, there is a case where the display control unit 154 suppresses the first display change with the action of the suppression control unit 155. Specifically what kind of display change the first and the second display changes are and what kind of a case the first and the second display changes are made will be described later.

The suppression control unit 155 suppresses the first display change that the display control unit 154 makes to the icon 121, the icon shadow 122, or the background 123 displayed on the LCD 120. The suppression control unit 155 may suppress the first display change based on a part or all of the inclination of the housing 110 acquired by the inclination acquisition unit 151, various contact operations acquired by the contact acquisition unit 152, and the shaking of the housing 110 acquired by the shaking acquisition unit 153. Specifically what kind of a case the suppression control unit 155 restricts the first display change will be described later.

The storage unit 160 temporarily or permanently stores various data relating to the process of the portable terminal 100. The storage unit 160 may be, for example, a semiconductor memory such as a flash ROM (Read Only Memory) or a DRAM, an optical disc such as a BD (Blu-ray Disc), a DVD (Digital Versatile Disc), or a CD (Compact Disc), a hard disk, or the like. The storage unit 160 may be a storage device built in the portable terminal 100 or a removable medium such as a memory card that can be loaded or unloaded on the portable terminal 100. In addition, the storage unit 160 may include a plurality of types of storage devices or a removable medium. The storage unit 160 can store programs executed by the CPU 150 in order to realize functions of the inclination acquisition unit 151, the contact acquisition unit 152, the shaking acquisition unit 153, the display control unit 154, and the suppression control unit 155, and other various functions. The programs may be stored in the storage unit 160 in advance, and may be programs provided by being stored in the removable medium or programs downloaded from a network through the communication unit 170 which are temporarily stored in the storage unit 160. Furthermore, the storage unit 160 can temporarily store information exchanged by the CPU 150 with the LCD 120, the touch panel 130, the acceleration sensor 140 and the communication unit 170, and information generated by the CPU 150 in the course of a process.

The communication unit 170 is a communication interface including a communication device for connecting to a network. The communication unit 170 can be a port or a communication card for, for example, a USB (Universal Serial Bus), an IEEE 1394, an SCSI (Small Computer System Interface), an HDMI (High-Definition Multimedia Interface), a LAN (Local Area Network), a Bluetooth (registered trademark), a WUSB (Wireless USB), or the like. The communication unit 170 is connected to a network such as the Internet, a household LAN, infrared communication, radio wave communication, satellite communication or the like, and exchanges various data regarding the process of the portable terminal 100. The communication unit 170 may download a program executed by the CPU 150 for realizing the functions of the inclination acquisition unit 151, the contact acquisition unit 152, the shaking acquisition unit 153, the display control unit 154, and the suppression control unit 155, and other various functions from a network and store the program in the storage unit 160.

(Operation of Portable Terminal)

Figure 3:
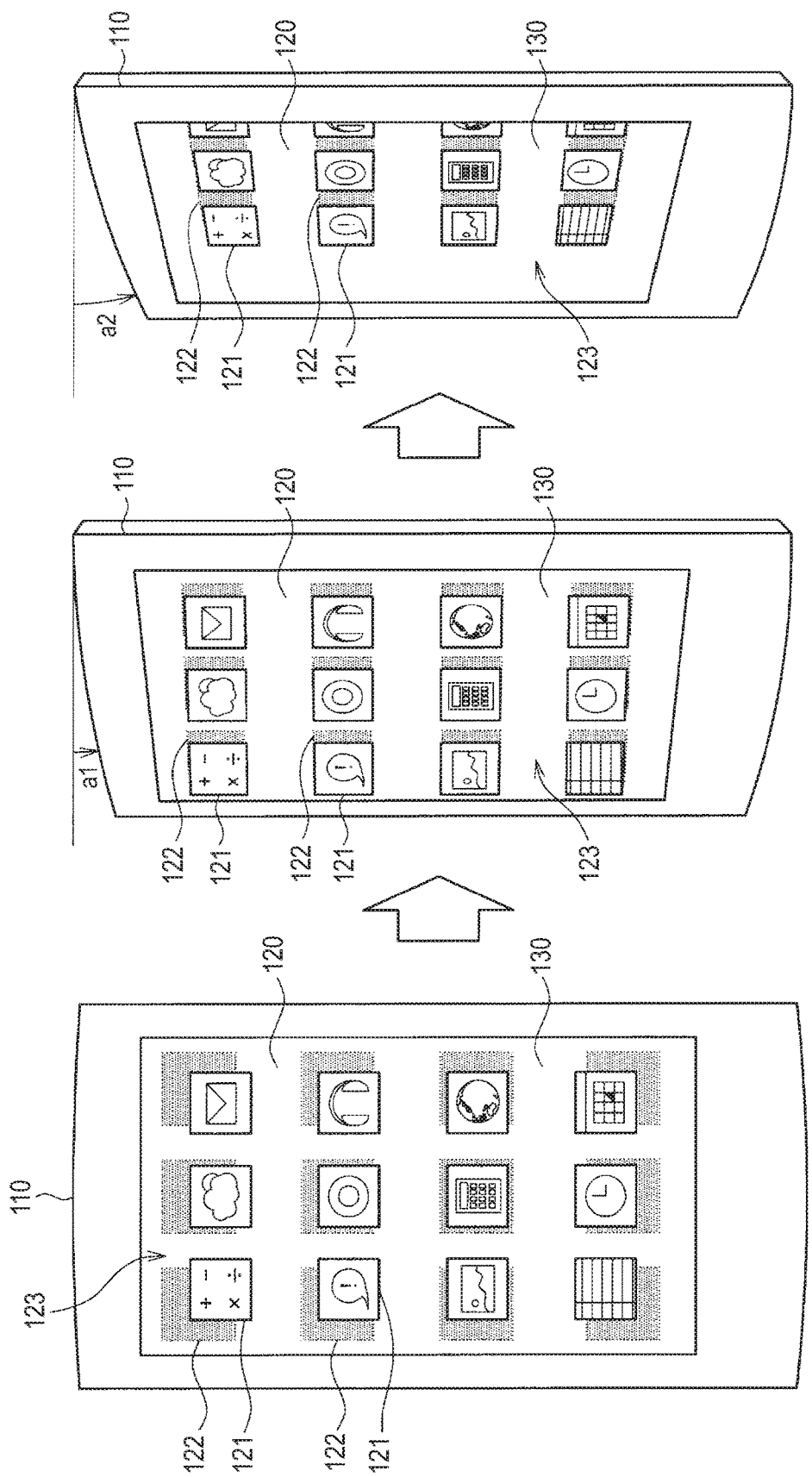
FIG. 3 is a diagram showing an example of a display change in the portable terminal according to the first embodiment of the present disclosure.

FIG. 3 is a diagram showing an operation example of the portable terminal 100 according to the first embodiment of the present disclosure. FIG. 3 shows changes in display positions of the icon 121 and the icon shadow 122 when the housing 110 of the portable terminal 100 is not inclined, and when the angle of inclination is an angle a1, and when the angle of further inclination is an angle a2 in the case where the housing is inclined. Furthermore, the angle a2 is an angle greater than the angle a1.

When the housing 110 is not inclined, each icon 121 is arrayed at a position with substantially the same intervals in the upper, lower, right and left sides as shown in the drawing. The display position of the icon shadow 122 is a position displaced in the direction toward the periphery from the center of the display unit 120 for each icon 121.

When the housing 110 is inclined and the angle of the inclination is the angle a1, the display position of the icon 121 does not move while being left at the display position in the state where the housing 110 is not inclined. On the other hand, the display position of the icon shadow 122 moves to the right side of the display unit 120, and is at a position displaced in the right side of each icon 121. The movement of the display position of the icon shadow 122 may be a movement according to the inclination of the housing 110. Furthermore, the display position of the icon 121 may move slightly to the right side of the display unit 120, not staying still, as described below.

When the housing 110 is further inclined to form the angle a2 as the angle of the inclination, the display position of the icon 121 moves to the right side of the display unit 120. On the other hand, the display position of the icon shadow 122 further moves to the right side of the display unit 120 from the state where the housing 110 is inclined by the angle a1. The movement of both display positions of the icon 121 and the icon shadow 122 as above can be movements corresponding to the movement of the housing 110.

At this time, a process responding to the inclination of the housing 110 may be further executed. The process may be a process in which a new icon 121 appears on the display unit 120, the icon 121 that has already been displayed is erased from the display unit 120, or the size of the displayed icon 121 changes. In addition, the process may not necessarily relate to a display change, and can be various kinds of processes that the portable terminal 100 can execute.

With the operation of the portable terminal 100 as described above, the movements of the icon 121 and the icon shadow 122 displayed on the display unit 120 when the housing 110 is gradually inclined can be observed by the user in such a way that, for example, the icon shadow 122 starts to move to the right side of the display unit 120 first, and the icon 121 starts to move to the right side later.

Furthermore, the arrangement of the icon 121 and the icon shadow 122 in the example shown in the drawing is just an example. The display position of the icon shadow 122 when the housing 110 is not inclined is not limited to the above example, and may be, for example, a position displaced to a different direction from the icon 121. In addition, as the display position of the icon shadow 122 when the housing 110 which is not inclined overlaps the icon 121, the icon shadow 122 after the housing 110 starts inclining may be displayed to be observed by the user.

In addition, in the above example, both display positions of the icon 121 and the icon shadow 122 move to the right side of the display unit 120 so as to rebound on the inclination of the housing 110, but the direction in which the display positions of the icon 121 and the icon shadow 122 move is not limited to the example. The display positions of the icon 121 and the icon shadow 122 may move, for example, to the left side of the display unit 120 as if the positions slide down by the inclination of the housing 110. Furthermore, it is needless to say that the direction of the display positions of the icon 121 and the icon shadow 122 is determined according to the direction in which the housing 110 is inclined.

In the portable terminal 100 that is operated as above, when the angle of inclination of the housing 110 is in the range including the angle a1, the "movement of the display position of the icon 121" that is the first display change that the display control unit 154 gives to the display image in the embodiment is suppressed by the suppression control unit 155. In addition, while the movement of the display position of the icon 121 is suppressed as such, "movement of the display position of the icon shadow 122" that is the second display change in the embodiment is executed by the display control unit 154.

(Process in Portable Terminal)

Figure 4:
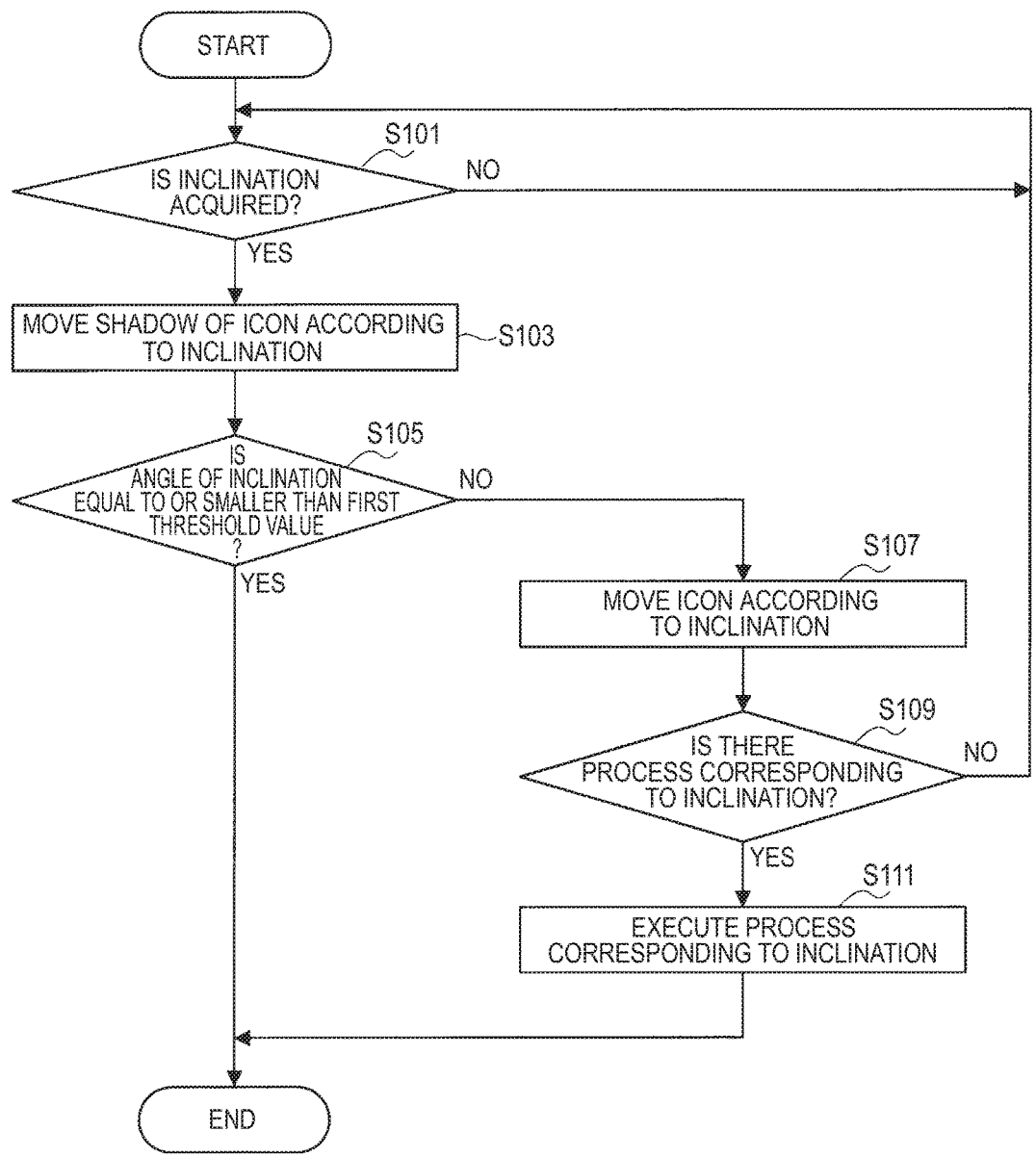
FIG. 4 is a flowchart showing a process executed in the portable terminal according to the first embodiment of the present disclosure.

FIG. 4 is a flowchart showing a process in the portable terminal 100 according to the first embodiment of the present disclosure. FIG. 4 shows a process of the portable terminal 100 according to the embodiment for executing a display change and a process according to the inclination of the housing 110 acquired by the inclination acquisition unit 151.

First, in Step S101, the display control unit 154 determines whether or not the inclination of the housing 110 is acquired by the inclination acquisition unit 151. When the inclination of the housing 110 is acquired here, the process advances to Step S103. On the other hand, when the inclination of the housing 110 is not acquired, the process returns to the start.

In Step S103, the display control unit 154 causes the display position of the icon shadow 122 displayed on the display unit 120 to move according to the inclination of the housing 110 acquired by the inclination acquisition unit 151. Furthermore, as described above, the movement of the display position of the icon shadow 122 is the second display change that the display control unit 154 brings about to the display image.

Successively in Step S105, the suppression control unit 155 determines whether or not the angle of the inclination of the housing 110 acquired by the inclination acquisition unit 151 is equal to or smaller than a first threshold value. When the angle of the inclination of the housing 110 is equal to or smaller than the first threshold value here, the suppression control unit 155 ends the series of process. On the other hand, when the angle of the inclination of the housing 110 exceeds the first threshold value, the process advances to Step S107. Furthermore, the first threshold value is a predetermined threshold value set for the inclination of the housing 110. In the example shown in FIG. 3, for example, the first threshold value is a value greater than the angle a1 and equal to or smaller than the angle a2.

In Step S107, the display control unit 154 causes the display position of the icon 121 displayed on the display unit 120 to move according to the inclination of the housing 110 acquired by the inclination acquisition unit 151. Furthermore, as described above, the movement of the display position of the icon 121 is the first display change that the display control unit 154 brings about to the display image.

Successively in Step S109, the CPU 150 determines whether or not a process corresponding to the inclination of the housing 110 acquired by the inclination acquisition unit 151 is set. When a process corresponding to the inclination is set here, the process advances to Step S111. On the other hand, when a process corresponding to the inclination is not set, the process returns to the start.

In Step S111, the CPU 150 executes the process corresponding to the inclination of the housing 110 acquired by the inclination acquisition unit 151. The process is not necessarily limited to the process of display changes by the display control unit 154, and may be another type of process that the portable terminal 100 can execute. A process that the display control unit 154 can execute here can be a process in which, for example, a new icon 121 appears on the display unit 120, an icon 121 that has already been displayed is erased from the display unit 120, the size of a displayed icon 121 changes, or the like. In addition, as another process that the portable terminal 100 can execute, there may be a process relating to, for example, voice calling, network communications, music and video reproduction, capturing moving or still images, or the like.

In the above-described process of the portable terminal 100, when the angle of the inclination of the housing 110 acquired by the inclination acquisition unit 151 is equal to or smaller than the first threshold value, the process ends by the suppression control unit 155. Accordingly, the "movement of the display position of the icon 121" that is the first display change that the display control unit 154 brings about to the display screen is not executed in that case. In other words, when the angle of the inclination of the housing 110 is equal to or smaller than the first threshold value, the "movement of the display position of the icon 121" that is the first display change is suppressed.

On the other hand, in the above-described process of the portable terminal 100, even when the angle of the inclination of the housing 110 acquired by the inclination acquisition unit 151 is equal to or smaller than the first threshold value, the "movement of the display position of the icon shadow 122" that is the second display change that the display control unit 154 brings about to the display screen is executed. In other words, while the "movement of the display position of the icon 121" that is the first display change is suppressed, the "movement of the display position of the icon shadow 122" that is the second display change is executed.

(Regarding Suppression of Display Change)

Figure 5:
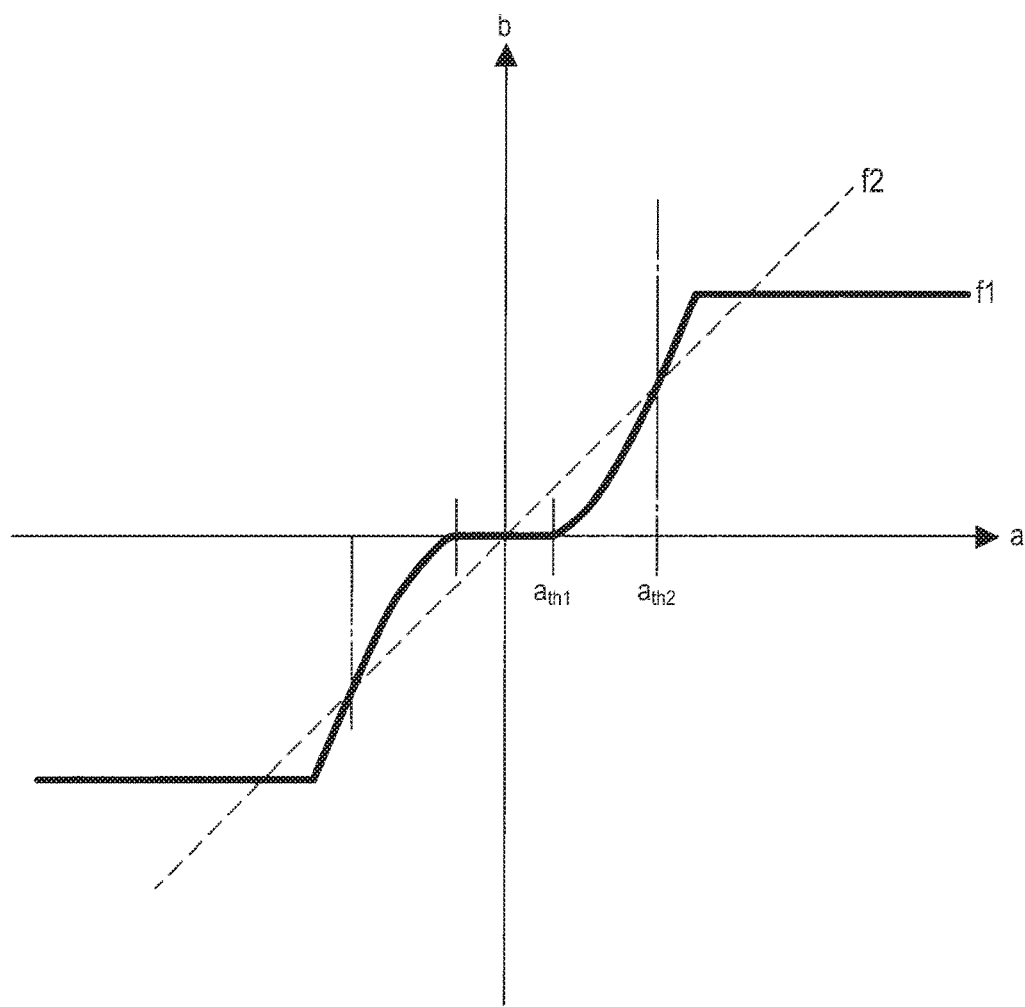
FIG. 5 is a diagram showing another example of a display change in the portable terminal according to the first embodiment of the present disclosure.

FIG. 5 is a diagram illustrating the definition of "suppression of the first display change" in the embodiment of the present disclosure. Referring to FIG. 5, the horizontal axis represents the inclination angle a of the housing 110, the vertical axis represents the quantity of a display change b, and an example of a function f1 showing the relationship between the inclination angle a and the quantity of a display change b in the first display change and of a function f2 showing the relationship between the inclination angle a and the quantity of a display change b in the second display change is shown. In the inclination angle a of the housing, two threshold values of ath1 and ath2 each corresponding to two definitions of "suppression of the first display change" are shown.

In the example shown in the drawing, when the inclination angle a is equal to or smaller than the threshold value ath1, the value of the quantity of a display change b of the function f1 is substantially 0. In a first definition, a state where the value of the quantity of a display change b of the function f1 is substantially 0 is defined as "a state where the first display change is suppressed". In this case, the "threshold value" is the threshold value ath1. As a first example of the display control in the first definition, the suppression control unit 155 of the portable terminal 100 may suppress the first display change by nullifying the inclination of the housing 110 acquired by the inclination acquisition unit 151 when the inclination angle a is equal to or smaller than the threshold value ath1. In addition, as a second example, the first display change may be suppressed in a way that the display control unit 154 calculates the quantity of a display change b with an arithmetic operation of b=c tan a for the first display change from the inclination angle a of the housing 110 acquired by the inclination acquisition unit 151 and the suppression control unit 155 sets a value of coefficient c so that the quantity of a display change b becomes substantially 0 when the inclination angle a is equal to or smaller than the threshold value ath1.

On the other hand, in the example shown in the drawing, when the inclination angle a is equal to or smaller than threshold value ath2, a value of the quantity of a display change b of the function f1 is lower than a value of the quantity of a display change b of the function f2. In the second definition, the state where a value of the quantity of a display change b of the function f1 is lower than a value of the quantity of a display change b of the function f2 is defined as a "state where the first display change is suppressed". In this case, the above-described "threshold value" is the threshold value ath2. As an example of display control in the second definition, the first display change may be suppressed in a way that the display control unit 154 calculates the quantity of a display change b with arithmetic operations of b=c tan a for the first display change and b=da for the second display change from the inclination angle a of the housing 110 acquired by the inclination acquisition unit 151 and the suppression control unit 155 sets values of coefficients c and d so that a value of the quantity of a display change b of the function f1 is lower than a value of the quantity of a display change b of the function f2 when the inclination angle a is equal to or smaller than the threshold value ath2.

Herein, the operation of the portable terminal 100 described with reference to FIGS. 3 and 4 above is based on the first definition. As described above, however, the "suppression of the first display change" of the present specification includes at least two definitions of the first and the second ones. For that reason, the operation of the portable terminal 100 as shown in FIG. 3 may be realized based on the second definition. In this case, the portable terminal 100 is in the state where the housing 110 is inclined by the angle a1, and the display position of the icon 121 may move to the slightly right side of the display unit 120 instead of not moving while being in the display position in the case where the housing 110 is not inclined.

Furthermore, as shown in FIG. 4, the display control unit 154 may apply another control to the quantity of a display change b of the first display change by setting the quantity of a display change b to a constant value when the inclination angle a exceeds a predetermined value. When the inclination angle a exceeds the threshold value ath1 or the threshold value ath2 and continues to increase, the display control unit 154 may control such that a value of the quantity of a display change b of the function f1 exceeds a value of the quantity of a display change b of the function f2 first and then a value of the quantity of a display change b of the function f2 exceeds a value of the quantity of a display change b of the function f1. In addition, in the same case, a value of the quantity of a display change b of the function f1 and a value of the quantity of a display change b of the function f2 may be controlled to be substantially the same value.

Modified Example 1

Figure 6:
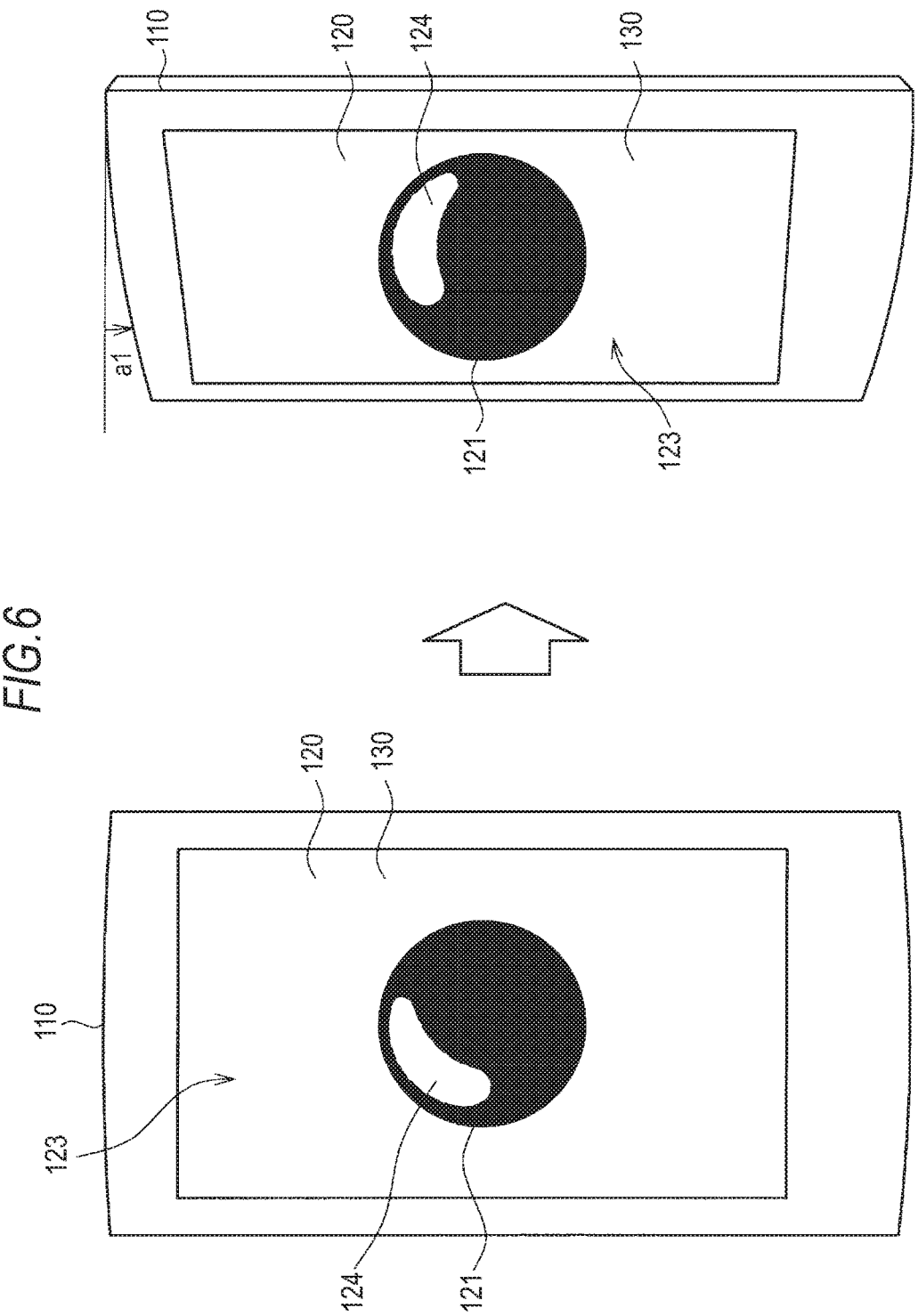
FIG. 6 is a diagram showing still another example of a display change in the portable terminal according to the first embodiment of the present disclosure.

FIG. 6 is a diagram illustrating a modified example of the portable terminal 100 according to a modified example of the first embodiment of the present disclosure. FIG. 6 shows a change in the display position of a glossy portion 124 when the state of portable terminal 100 changes from the state where the housing 110 is not inclined to the state where the housing 110 is inclined by the angle a1. Furthermore, as described above, the angle a1 is an angle smaller than the first threshold value at which the movement of the display position of the icon 121 is suppressed for the inclination of the housing 110.

In the modified example, the icon 121 is displayed as an object in a flat spherical shape of which the surface bulges. The glossy portion 124 of the icon is displayed as an area on the surface of the icon 121 on which light is reflected to change the color in order to, for example, express a stereoscopic effect of the icon 121.

When the housing 110 is inclined and the angle of the inclination is the angle a1, the display position of the icon 121 does not move while being in the display position in the state where the housing 110 is not inclined. On the other hand, the display position of the glossy portion 124 of the icon moves on the surface of the icon 121 clockwise from the display position in the state where the housing 110 is not inclined and is in a position where the display position of the glossy portion 124 moves to the slightly right side of the display unit 120. In the modified example, the second display change by the display control unit 154 is the movement of the display position of the glossy portion 124 of the icon. The movement of the display position of the glossy portion 124 of the icon may be a movement according to the inclination of the housing 110. Furthermore, as described above, the display position of the icon 121 does not stay still, but may move to the slightly right side of the display unit 120.

Although not shown in the drawing, when the housing 110 is further inclined and the angle of the inclination is the angle a2, the movement of the display position of the icon 121 and the further movement of the glossy portion 124 of an icon are the same as in the operation example of the present embodiment described with reference to FIG. 3.

Modified Example 2

FIG. 7 is a diagram illustrating another modified example of the portable terminal 100 according to the modified example of the first embodiment of the present disclosure. FIG. 7 shows a change in the display of the background 123 when the state of the portable terminal 100 changes from the state where the housing 110 is not inclined and to the state where the housing 110 is inclined by the angle a1. Furthermore, as described above, the angle a1 is an angle smaller than the first threshold value at which the movement of the display position of the icon 121 is suppressed for the inclination of the housing 110.

In the modified example, the background 123 has a pattern of a radial shape and a concentric shape as shown in the drawing. The pattern can be stereoscopically drawn as an inner face of a virtual hemisphere face. Furthermore, the pattern is an example for making a change in the display of the background 123 in the modified example easily understood. The pattern of the background 123 may be any pattern with which a change in the display as in the modified example can be recognized.

When the housing 110 is inclined and the angle of the inclination is the angle a1, the display position of the icon 121 does not move while being in the display position in the state where the housing 110 is not inclined. On the other hand, the background 123 changes so that the virtual hemisphere face rotates from the display of the state where the housing 110 is not inclined, and the displayed pattern turns into a different pattern. In the modified example, the second display change by the display control unit 154 is a change in the display of the background 123. The change of the display of the background 123 may be movement according to the inclination of the housing 110. Furthermore, as described above, the display position of the icon 121 does not stand still, but may move to the slightly right side of the display unit 120.

Although not shown in the drawing, when the housing is further inclined and the angle of the inclination is the angle a2, a movement of the display position of the icon 121 and a further change in the display of the background 123 are the same as in the operation example of the embodiment described with reference to FIG. 3.

(Summary of First Embodiment)

In the first embodiment of the present disclosure described above, there is provided the portable terminal 100 including the inclination acquisition unit 151 which acquires inclination of the housing 110 provided with the LCD 120 on which an image is displayed, the display control unit 154 which gives the first and the second display changes to the displayed image according to the acquired inclination of the housing 110, and the suppression control unit 155 which suppresses the first display change.

As described above, in the embodiment, the first display change is the movement of the display position of the icon 121 that is an object included in the images displayed on the LCD 120. The second display change is the movement of the display position of the icon shadow 122. As described as the modified examples, the second display change may be the movement of the display position of the glossy portion 124 of the icon and a change in the background 123 of the image displayed on the LCD 120. Furthermore, the second display change may be a change in display in which the above changes are combined.

According to the configuration, when it is desired that the display position of the icon 121 does not move even though the housing 110 of the portable terminal 100 is inclined, for example, when the angle of the inclination of the housing 110 is equal to or smaller than a predetermined threshold value, the movement of the display position of icon 121 by the inclination of the housing 110 is suppressed. For this reason, it is possible to prevent a change in the display position of the icon 121 that the user does not want. On the other hand, while the movement of the display position of the icon 121 is suppressed, the display position of the icon shadow 122 moves. With the movement of the display position of the icon shadow 122 that is the second display change, the user can be made aware that the display position of the icon 121 can be moved by the inclination of the housing 110. In other words, when there is no movement of the icon 121 even though the housing 110 is inclined, the user can be made aware that this is not because the portable terminal 100 is not responding to the inclination of the housing 110, but the movement of the icon 121 is suppressed due to a predetermined condition, for example, a condition that the angle of the inclination of the housing 110 is equal to or smaller than a predetermined threshold value.

In the embodiment, when the inclination of the housing 110 acquired by the inclination acquisition unit 151 is equal to or smaller than the first threshold value, the movement of the display position of the icon 121 may be suppressed. With the configuration, it is possible to hinder the movement of the icon 121 by a trivial change in the user's posture when the user holds the portable terminal 100, in opposition to the user's intention.

In addition, in the embodiment, the movement of the display position of the icon shadow 122 that is the second display change may be a display change according to the inclination of the housing 110 acquired by the inclination acquisition unit 151. With the configuration, it is possible to give an intuitive hint to the user that the display position of the icon 121 can be moved by the inclination of the housing 110.

2. Second Embodiment

Subsequently, a second embodiment of the present disclosure will be described. Furthermore, since the configuration of the portable terminal 100 is substantially the same in the second and the first embodiment, detailed description thereof will be omitted.

(Operation of Portable Terminal)

Figure 8:
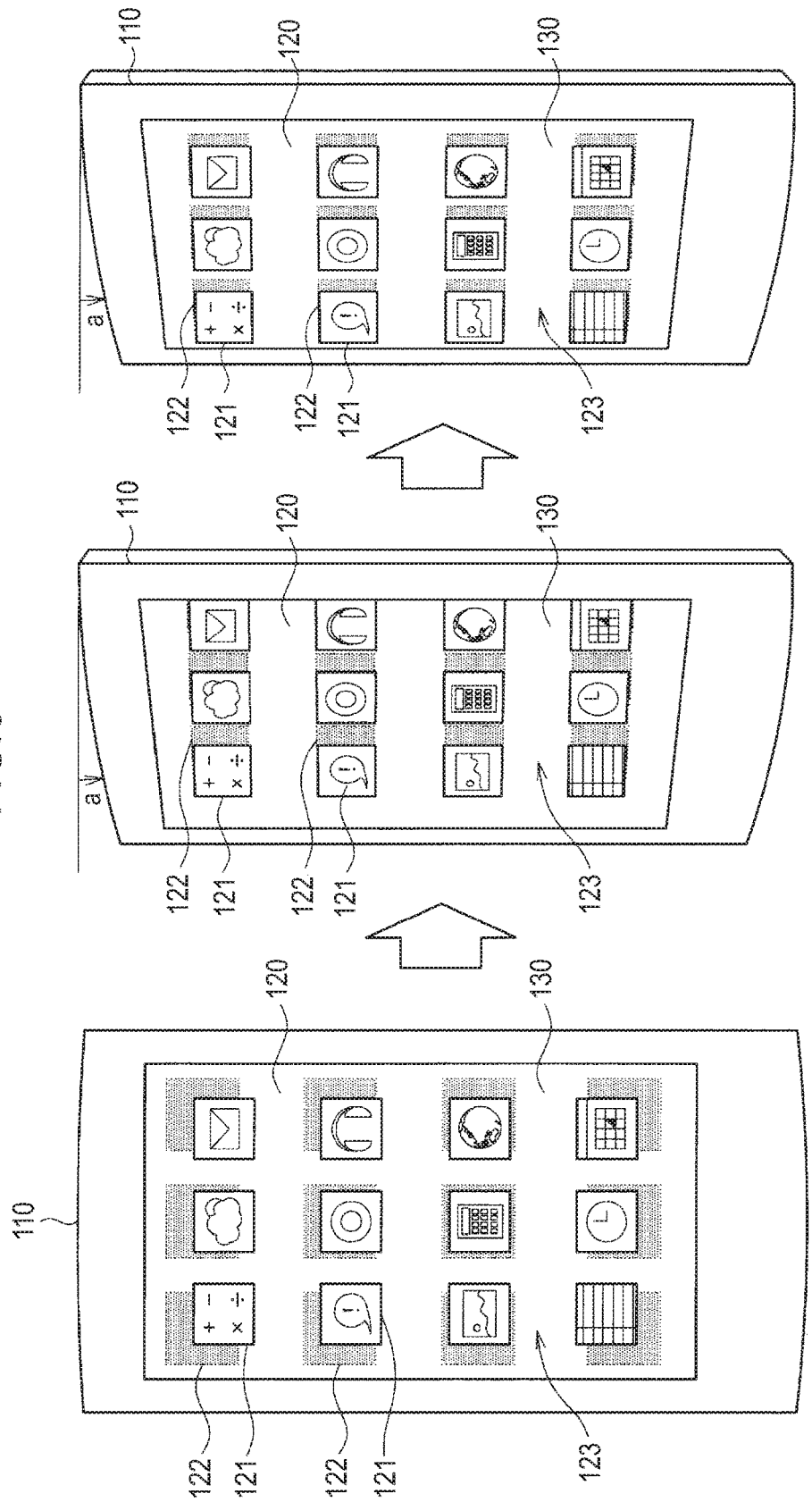
FIG. 8 is a flowchart showing a process executed in the portable terminal according to the second embodiment of the present disclosure.

FIG. 8 is a diagram showing an operation example of the portable terminal 100 according to the second embodiment of the present disclosure. FIG. 8 shows changes of the display position of the icon 121 when the housing 110 of the portable terminal 100 is not inclined, when the angle of the inclination is an angle a when the housing 110 is inclined, and when a predetermined time passes after the angle of the inclination is the angle a.

When the housing 110 is not inclined, each icon 121 is arrayed at a position with substantially the same intervals in the upper, lower, right and left sides as shown in the drawing. The display position of the icon shadow 122 is a position displaced in the direction toward the periphery from the center of the display unit 120 for each icon 121.

When the housing 110 is inclined and the angle of the inclination is the angle a, the display position of the icon 121 first moves to the right side of the display unit 120 from the display position of the state where the housing 110 is not inclined. Furthermore, in this case, the icon shadow 122 may move to the right side of the display unit 120 to be displayed at a position displaced to the right side of each icon 121.

When a predetermined time passes after the angle of the inclination of the housing 110 is the angle a, the display position of the icon 121 returns to the display position of the state where the housing 110 is not inclined again from the position in which the display position of the icon 121 moved at the first. Furthermore, in this case, the icon shadow 122 may be continuously displayed at a position displaced to the right side of each icon 121.

The movement of the icon 121 displayed on the display unit 120 when a predetermined time passes in the state where the housing 110 is inclined by the operation of the portable terminal 100 as above is observed by the user as a movement that the icon 121 first moves in the direction in which the icon 121 is assumed to move when, for example, the housing 110 is inclined, and then returns to the original position.

Furthermore, the arrangement of the icon 121 in the example shown in the drawing is just an example. In addition, in the above example, all display positions of the icon 121 move to the right side of the display unit 120 so as to rebound on the inclination of the housing 110, but the direction in which the display positions of the icon 121 moves is not limited thereto. For example, the display position of the icon 121 may move to the left side of the display unit 120 when there is the same inclination of the housing 110 as in the example shown in the drawing. Furthermore, it is needless to say that the direction in which the display position of the icon 121 moves is determined according to the direction in which the housing 110 is inclined.

In the portable terminal 100 that operates as above, the "movement of the display position of the icon 121" that is the first display change that the display control unit 154 brings about to the display image in the embodiment is suppressed by the suppression control unit 155 due to a predetermined condition. In addition, while the movement of the display position of the icon 121 is suppressed as above, "the display position of the icon 121 moves first and returns" that is the second display change in the embodiment is executed by the display control unit 154.

Herein, the predetermined condition with which the suppression control unit 155 suppresses the "movement of the display position of the icon 121" that is the first display change may be, for example, acquisition of a user's contact with the display unit 120 by the contact acquisition unit 152. In addition, the predetermined condition may be that an angle a of the inclination of the housing 100 is equal to or smaller than a predetermined threshold value. In addition, the predetermined condition may be setting of the portable terminal 100 so that a display change by inclination is nullified.

(Process in Portable Terminal)

Figure 9:
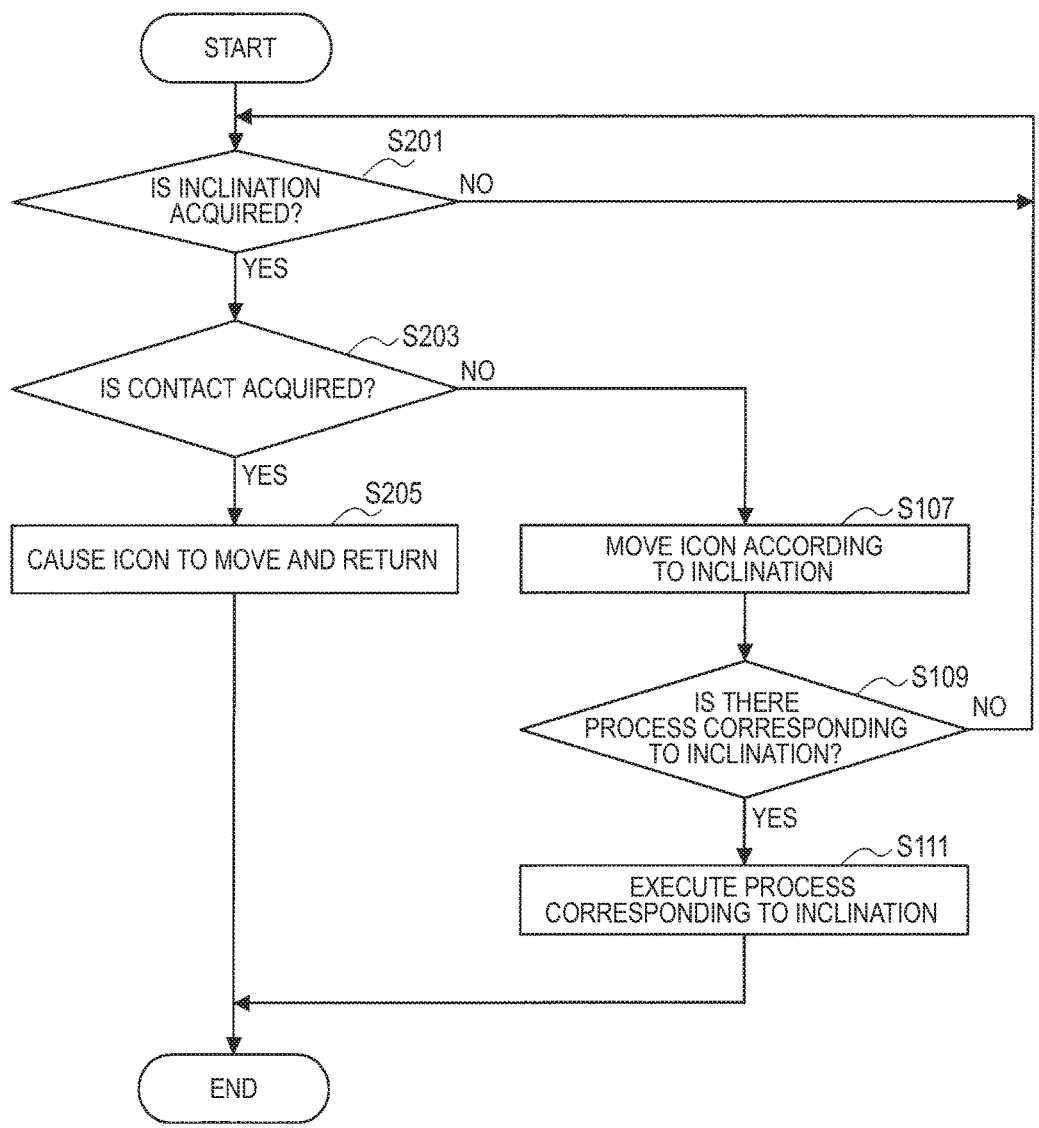
FIG. 9 is a flowchart showing a process executed in a portable terminal according to a third embodiment of the present disclosure.

FIG. 9 is a flowchart showing a process in the portable terminal 100 according to the second embodiment of the present disclosure. FIG. 9 shows a process of the portable terminal 100 according to the embodiment for executing a display change and a process according to the inclination of the housing 110 acquired by the inclination acquisition unit 151. In the example shown in the drawing, a predetermined condition with which the suppression control unit 155 suppresses a movement of the display position of the icon 121 is acquisition of a user's contact with the display unit 120 by the contact acquisition unit 152.

First, in Step S201, the display control unit 154 determines whether or not the inclination of the housing 110 is acquired by the inclination acquisition unit 151. When the inclination of the housing 110 is acquired here, the process advances to Step S203. On the other hand, when the inclination of the housing 110 is not acquired, the process returns to the start.

In Step S203, the suppression control unit 155 determines whether or not a user's contact with the display unit 120 is acquired by the contact acquisition unit 152. When the user's contact with the display unit 120 is acquired here, the process advances to Step S205. On the other hand, when the user's contact with the display unit 120 is not acquired, the process advances to Step S107.

In Step S205, the display control unit 154 causes the display position of the icon 121 to move first and to return. Furthermore, as described above, that the display position of the icon 121 moves first and returns is the second display change that the display control unit 154 brings about to the display image.

Furthermore, since the process of Steps S107 to S111 is the same as that in the first embodiment described above referring to the same reference numerals in FIG. 4 detailed description thereof is omitted.

When the user's contact with the display unit 120 is acquired by the contact acquisition unit 152 in the above process of the portable terminal 100, the same second display change of "the display position of the icon 121 is caused to move first and return" is executed instead of executing the first display change of the "movement of the display position of the icon 121" that the display control unit 154 brings about to the display screen. In other words, when the user's contact with the display unit 120 is acquired by the contact acquisition unit 152, the second display change of "the display position of the icon 121 is caused to move first and return" is executed while the first display change of the "movement of the display position of the icon 121" is suppressed.

(Summary of Second Embodiment)

In the second embodiment of the present disclosure described above, the portable terminal 100 is further provided with the contact acquisition unit 152 which acquires a user's contact with the LCD 120, and the suppression control unit 155 suppresses the first display change when the contact is acquired.

As described above, in the embodiment, the first display change is a movement of the display position of the icon 121 that is an object included in an image displayed on the LCD 120. The second display change is that the display position of the icon 121 is caused to move first and return.

With the configuration, for example, when a user performs a contact operation to the icon 121 displayed on the LCD 120 of the portable terminal 100, a movement of the display position of the icon 121 by inclination of the housing 110 is suppressed. For that reason, even when the user who is performing the contact operation inclines the housing 110 without intention, it is possible to prevent an erroneous operation resulting from the movement of the display position of the icon 121. In addition, it is possible to intentionally suppress a movement of the display position of the icon 121 by inclination of the housing 110 in a way that the user contacts an area where the background 123 is displayed and an operation instruction to the portable terminal 100 is not given even with a user's contact. For example, when the user changes a way of holding the portable terminal 100, it is possible to prevent an unintended movement of the display position of the icon 121 caused by inclination of the housing 110 when the way of holding is changed, by changing the way of holding while contacting the area where the background 123 is displayed.

3. Third Embodiment

Subsequently, a third embodiment of the present disclosure will be described. Furthermore, since the configuration of the portable terminal 100 and the display change that the display control unit 154 brings about to the display screen in the third embodiment are substantially the same as those in the first embodiment, detailed description thereof will be omitted.

(Process in Portable Terminal)

Figure 10:
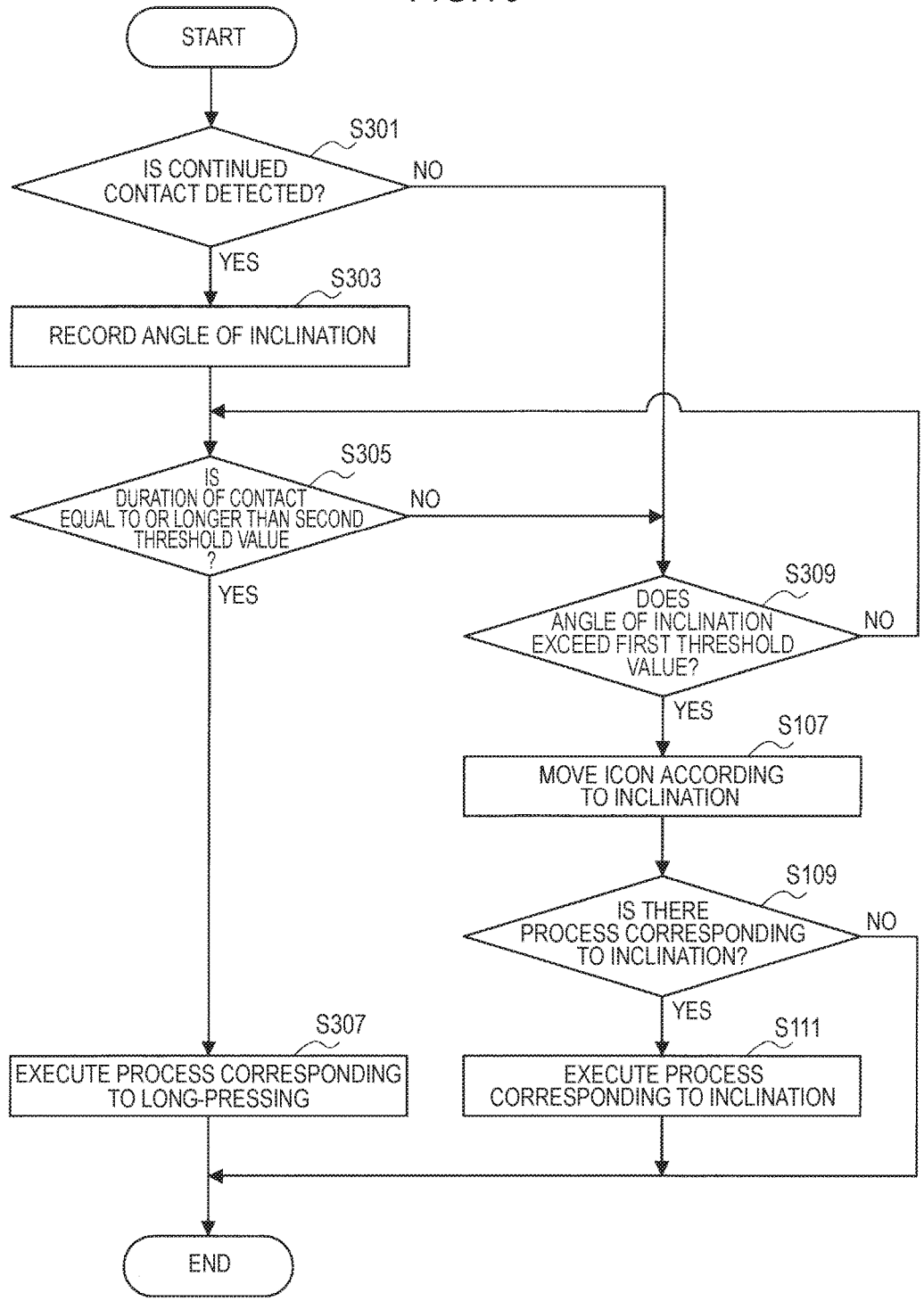
FIG. 10 is a diagram showing an example of a display change in a portable terminal according to a fourth embodiment of the present disclosure.

FIG. 10 is a flowchart showing a process in the portable terminal 100 according to the third embodiment of the present disclosure. FIG. 10 shows a process of the portable terminal 100 according to the present disclosure for executing a display change and a process according to inclination of the housing 110 acquired by the inclination acquisition unit 151. In the example shown in the drawing, when the duration of a user's contact with the display unit 120 is equal to or longer than the second threshold value, the contact acquisition unit 152 acquires the contact as a long-pressing operation.

First, in Step S301, the contact acquisition unit 152 determines whether or not the continued contact of the user with the display unit 120 is detected by the touch panel 130. When the continued contact of the user with the display unit 120 is detected here, the process advances to Step S303. On the other hand, when the continued contact of the user with the display unit 120 is not detected, the process advances to S309.

In Step S303, the inclination acquisition unit 151 records the angle of the inclination of the housing 110 at the time as a reference angle.

Successively in Step S305, the contact acquisition unit 152 determines whether or not the duration of the user's contact with the display unit 120 that has been detected by the touch panel 130 is equal to or longer than the second threshold value. When the duration of the user's contact with the display unit 120 is equal to or longer than the second threshold value, the process advances to Step S307. On the other hand, when the duration of the user's contact with the display unit 120 does not satisfy the second threshold value, the process advances to Step S309.

In Step S307, the CPU 150 executes a process corresponding to a long-pressing operation of the display unit 120 acquired by the contact acquisition unit 152. The process can be a process relating to other kinds of process that the portable terminal 100 can execute, for example, voice calling, network communication, music and video reproduction, capturing moving and still images, or the like, in addition to a process of a display change by the display control unit 154.

In Step S309, the suppression control unit 155 determines whether or not the angle of the inclination of the housing 110 acquired by the inclination acquisition unit 151 is equal to or smaller than the first threshold value. When the angle of the inclination of the housing 110 is equal to or smaller than the first threshold value, the process advances to Step S305, and determines again whether or not the duration of the user's contact with the display unit 120 is equal to or longer than the second threshold value. On the other hand, when the angle of the inclination of the housing 110 exceeds the first threshold value, the process advances to Step S107.

Furthermore, the process of Steps S107 to S111 is substantially the same as the process in the first embodiment described above referring to the same reference numerals in FIG. 4, detailed description thereof will be omitted.

In the process of the portable terminal 100, when the angle of the inclination of the housing 110 acquired by the inclination acquisition unit 151 is equal to or smaller than the first threshold value, acquisition of the user's continued contact with the display unit 120 by the contact acquisition unit 152 continues, and when the duration of the contact is equal to or longer than the second threshold value, the contact acquisition unit 152 acquires the contact as a long-pressing operation. On the other hand, when the angle of the inclination of the housing 110 acquired by the inclination acquisition unit 151 exceeds the first threshold value before the duration of the contact is equal to or longer than the second threshold value, a process corresponding to the inclination of the housing 110 is executed. In this case, the contact that the contact acquisition unit 152 acquires is not acquired by a long-pressing operation. In other words, when the angle of the inclination of the housing 110 exceeds the first threshold value, the acquisition of the long-pressing operation by the contact acquisition unit 152 is suppressed, instead of cancelling suppression of the "movement of the display position of the icon 121" that is the first display change.

(Summary of Third Embodiment)

In the third embodiment of the present disclosure described above, the portable terminal 100 further includes the contact acquisition unit 152 which acquires contact when the duration of the user's contact with the LCD 120 is equal to or longer than the second threshold value, as a long-pressing operation, and the suppression control unit 155 suppresses the acquisition of long-pressing operation when the acquired angle of inclination of the housing 110 exceeds the first threshold value before the duration of the acquired contact is equal to or longer than the second threshold value.

As described above, in the embodiment, the first display change is a movement of the display position of the icon 121 that is an object included in the image displayed on the LCD 120.

With the configuration, for example, when the angle of the inclination of the housing 110 exceeds a predetermined threshold value in which the display position of the icon 121 starts moving before the duration of the user's contact operation to the icon 121 displayed on the LCD 120 of the portable terminal 100 exceeds the predetermined threshold value with which the operation is determined to be a long-pressing operation, acquisition of the user's contact operation is cancelled. For that reason, even when the user performing a long-pressing operation for the icon 121 unintentionally inclines the housing 110, it is possible to prevent an erroneous operation caused by moving the display position of the icon 121.

4. Fourth Embodiment

Subsequently, a fourth embodiment of the present disclosure will be described. Furthermore, since the configuration of the portable terminal 100 in the fourth embodiment is substantially the same as that in the first embodiment, detailed description thereof will be omitted.

(Operation of Portable Terminal)

Figure 11:
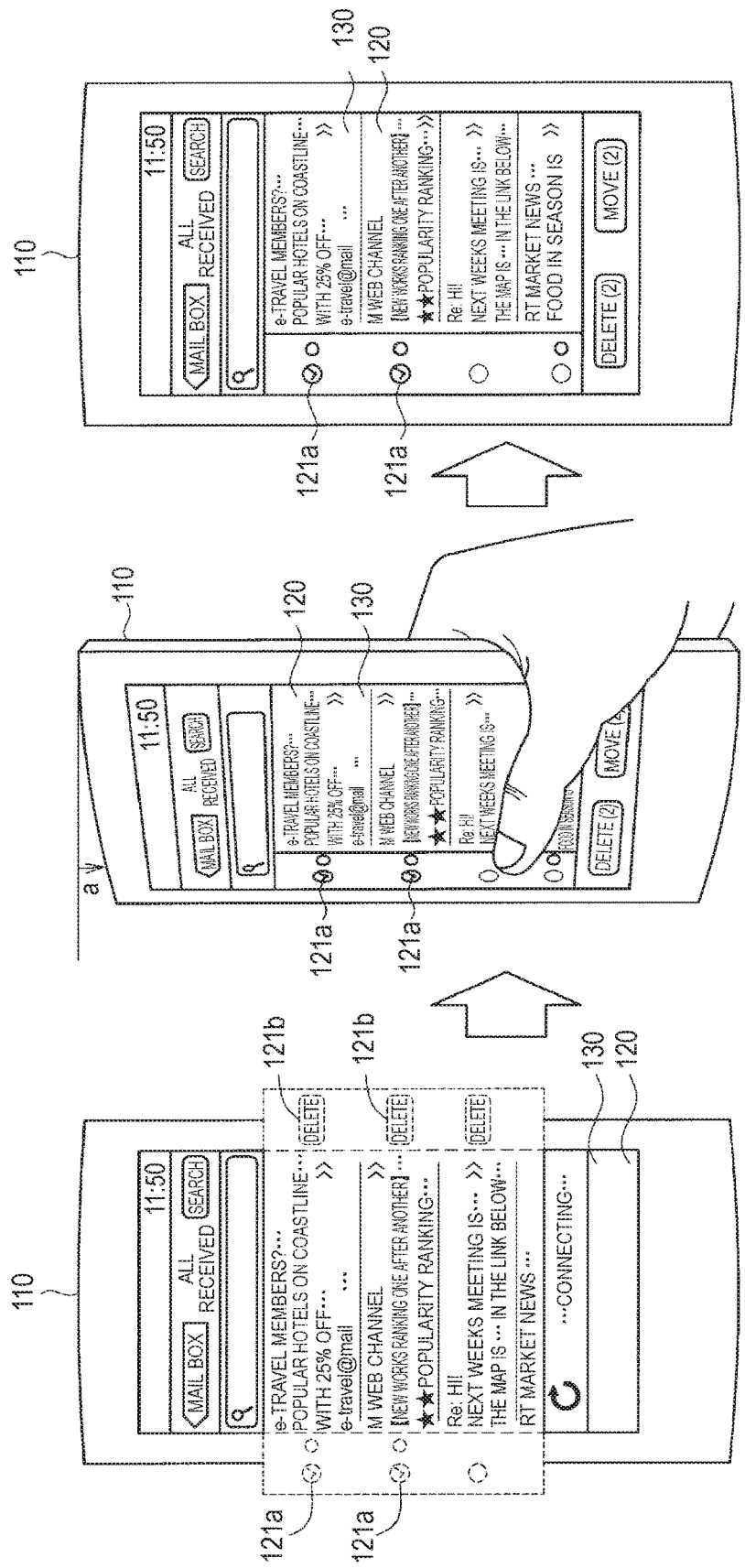
FIG. 11 is a diagram illustrating an example of suppression of a display change in each embodiment of the present disclosure.

FIG. 11 is a diagram showing an operation example of the portable terminal 100 according to the fourth embodiment of the present disclosure. FIG. 11 shows changes in the display position of the icon 121 in the state where the housing 110 of the portable terminal 100 is not inclined, where the angle of the inclination is an angle a when the housing is inclined and a movement operation (flicking operation) on the touch panel 130 is performed, and where operations of movement and inclination are ended.

The LCD 120 displays the screen of the received e-mail list. The screen of the received e-mail list includes a deletion mark 121*a* for selecting an e-mail to be deleted, and a delete button 121*b*. In the state where the housing 110 is not inclined, however, the deletion mark 121*a* and the delete button 121*b* are not displayed on the LCD 120. Furthermore, the deletion mark 121*a* and the delete button 121*b* are objects that can be displayed on the LCD 120 in the embodiment.

Herein, when a user inclines the housing 110 by the angle a and performs a movement operation (flicking operation) for the touch panel 130 to the right direction of the LCD 120, the screen of the received e-mail list displayed on the LCD 120 moves to the right side of the LCD 120, and the deletion mark 121*a* appears from the left edge of the LCD 120.

The deletion mark 121*a* is displayed on the left edge of the LCD 120 in a state where the above operation is ended. The user can switch a selection state and a non-selection state of, for example, the deletion mark 121a by contacting a portion of the deletion mark 121a of the touch panel 130.

Furthermore, in the embodiment, the suppression control unit 155 suppresses a movement of the display position of the deletion mark 121a by the display control unit 154 when the contact acquisition unit 152 does not acquire the movement operation of the user to the touch panel 130 even when the inclination of the housing 110 is acquired by the inclination acquisition unit 151.

In the portable terminal 100 that operates as above, a "movement of the display position of the deletion mark 121a" that is a first display change that the display control unit 154 brings about to the display image in the embodiment is suppressed in cases other than the case where contact acquired by the contact acquisition unit 152 is a movement operation (flicking operation) of the deletion mark 121a. Furthermore, the delete button 121b can be displayed on the LCD 120 in the same manner as the deletion mark 121a by inclining the housing 110 in, for example, the opposite direction to the example shown in the drawing and performing a movement operation through the touch panel 130.

(Summary of Fourth Embodiment)

In the fourth embodiment of the present disclosure described above, the portable terminal 100 further includes the contact acquisition unit which acquires a user's contact with the LCD 120 as an operation instruction, and the suppression control unit 155 suppresses the first display change in cases other than a case where the acquired contact is a movement operation for an object.

As described above, in the embodiment, the first display change is a movement of the display position of the icon 121 that is an object included in the image displayed on the LCD 120.

The configuration can be applied to, for example, a case where objects such as the deletion mark 121a, the delete button 121b of content, and the like, an erroneous operation of which causes a significant influence are included in the screen displayed on the LCD 120. In this case, the objects including the deletion mark 121a are arranged at first outside the area displayed on the LCD 120. When a user inclines the housing 110, and then performs a movement operation (flicking operation) through the touch panel 130, the display position of the deletion mark 121a is moved and the deletion mark appears on the LCD 120. In other words, with simple inclination of the housing 110, the display position of the deletion mark 121a is not moved, and the display area on the LCD 120 that the user can operate does not appear. Therefore, it is possible to prevent erroneous operations caused by inclination of the housing 110 that the user does not intended for the objects such as the deletion mark 121a, an erroneous operation of which causes a significant influence.

5. Fifth Embodiment

Subsequently, a fifth embodiment of the present disclosure will be described. Furthermore, since the configuration of the portable terminal 100, operations and processes relating to display in the fifth embodiment is substantially the same as those in the first embodiment, detailed description thereof will be omitted.

In the fifth embodiment of the present disclosure described above, when shaking of the housing 110 is acquired by the shaking acquisition unit 153 of the portable terminal 100 shown in FIG. 1, the display control unit 154 acquires the angle of the inclination of the housing 110 acquired by the inclination acquisition unit 151 at that time as a reference angle of the inclination of the housing 110.

With the configuration, a user can perform an operation of inclining the portable terminal 100 even when an operating posture of the user is changed, with a reference of a state where the portable terminal 100 is positioned in front of the user by performing an action of, for example, shaking the portable terminal 100.

6. Supplement

Hereinabove, exemplary embodiments of the present disclosure have been described in detail with reference to accompanying drawings, but the present disclosure is not limited thereto. It is clear that any person who has general knowledge in the technical field to which the present disclosure belongs can achieve various modified examples and amended examples within the category of the technical gist described in the claims, and it is understood that the examples certainly belong to the technical range of the present disclosure.

For example, in each of the embodiments above, a portable terminal is described as an example of an information processing device, but the present disclosure is not limited to the example. The information processing device can be all devices, for example, a tablet PC (Personal computer), a portable game device, and the like, that have display units and a user can incline.

In addition, for example, in each of the embodiments above, a movement of the display position of an object included in an image is exemplified as a display change for the image displayed on a display unit, but the present disclosure is not limited to the example. The object, for example, may rotate without moving the display position, or may appear or be erased without moving the display position.

The present disclosure contains subject matter related to that disclosed in Japanese Priority Patent Application JP 2010-263408 filed in the Japan Patent Office on Nov. 26, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
at least one processor configured to:
    acquire a touch input from a touch sensor of a portable terminal;
    acquire, from an acceleration sensor of the portable terminal, inclination information of the portable terminal;
    control a display unit of the portable terminal to display a first object and a second object associated with the first object;
    determine, based on the touch input and the inclination information, whether the portable terminal is in a first state a second state, or a third state, wherein
        in the first state, a duration of the touch input is lower than a time threshold value and angle of inclination of the portable terminal is lower than an angle threshold value,
        in the second state, the duration of the touch input is lower than the time threshold value and the angle of inclination of the portable terminal is equal to or larger than the angle threshold value, and in the third state, the duration of the touch input is equal to or larger than the time threshold value;

control, based on the determination that the portable terminal is in the first state, the display unit to execute a first inclination process to move a second image toward an edge of the display unit while suppressing movement of a first image;

control, based on the determination that the portable terminal is in the second state, the display unit to execute a second inclination process to move the first image; and control, based on the determination that the portable terminal is in the third state, the display unit to execute a long-touch process different from each of the first inclination process and the second inclination process.

2. The information processing apparatus according to claim 1, wherein the at least one processor is further configured to
record an angle of the portable terminal when the touch sensor detects the touch input; and
determine, based on the touch input and the inclination information with respect to the recorded angle, whether the portable terminal is in the first state, the second state, or the third state.

3. An information processing method, comprising:

in a portable terminal:
acquiring a touch input from a touch sensor of the portable terminal;
acquiring, from an acceleration sensor of the portable terminal, inclination information of the portable terminal,
controlling a display unit of the portable terminal to display a first object and a second object associated with the first object;
determining, based on the touch input and the inclination information, whether the portable terminal is in a first state, a second state, or a third state, wherein
in the first state, a duration of the touch input is lower than a time threshold value and angle of inclination of the portable terminal is lower than an angle threshold value,
in the second state, the duration of the touch input is lower than the time threshold value and the angle of inclination of the portable terminal is equal to or larger than the angle threshold value, and
in the third state, the duration of the touch input is equal to or larger than the time threshold value;
controlling, based on the determination that the portable terminal is in the first state, the display unit to execute a first inclination process to move a second image toward an edge of the display unit while suppressing movement of a first image;
controlling, based on the determination that the portable terminal is in the second state, the display unit to execute a second inclination process to move the first image; and
controlling, based on the determination that the portable terminal is in the third state, the display unit to execute a long-touch process different from each of the first inclination process and the second inclination process.

4. A non-transitory computer-readable medium having stored thereon computer-executable instructions which, when executed by a portable terminal, cause the portable terminal to execute operations, the operations comprising:
acquiring a touch input from a touch sensor of the portable terminal;
acquiring, from an acceleration sensor of the portable terminal, inclination information of the portable terminal,
controlling a display unit of the portable terminal to display a first object and a second object associated with the first object;
determining, based on the touch input and the inclination information, whether the portable terminal is in a first state, a second state, or a third state, wherein
in the first state, a duration of the touch input is lower than a time threshold value and angle of inclination of the portable terminal is lower than an angle threshold value,
in the second state, the duration of the touch input is lower than the time threshold value and the angle of inclination of the portable terminal is equal to or larger than the angle threshold value, and
in the third state, the duration of the touch input is equal to or larger than the time threshold value;
controlling, based on the determination that the portable terminal is in the first state, the display unit to execute a first inclination process to move a second image toward an edge of the display unit while suppressing movement of a first image;
controlling, based on the determination that the portable terminal is in the second state, the display unit to execute a second inclination process to move the first image; and
controlling, based on the determination that the portable terminal is in the third state, the display unit to execute a long-touch process different from each of the first inclination process and the second inclination process.

* * * * *